Patented Oct. 14, 1952

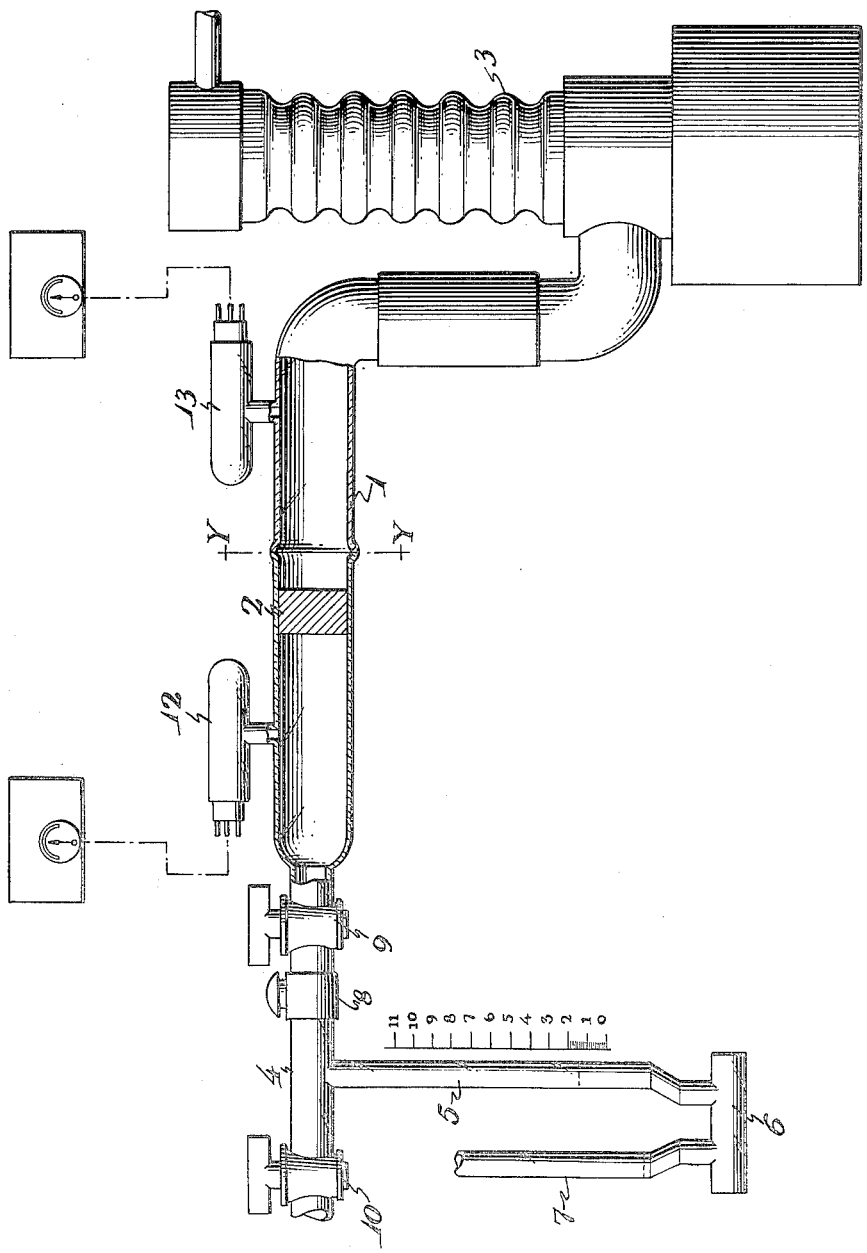

2,613,531

UNITED STATES PATENT OFFICE 2,613,531

DIFFUSION MEASURING METER

Conrad G. Bacon, Oak Ridge, Tenn., assignor, by mesne assignments, to the United States of America as represented by the United States Atomic Energy Commission Application November 14, 1944, Serial No. 563,400

2 Claims. (Cl. 73—38)

This invention is concerned with means for measuring the porosity of various materials, that is, the amenability of a material or substance to the diffusion of a gas therethrough. The invention finds particular application in the field of ultra high vacuum engineering in the testing of material and substances to be used in or in connection with ultra high vacuum systems. In these systems, the porosity of material or substances used becomes highly significant since substances which are too porous are not feasible for use in such systems, inasmuch as they permit leakage by diffusion of gases directly therethrough. Such substances may absorb or adsorb volumes of gases which may then be released rendering it difficult to attain or maintain high vacuum in the system.

An object of my invention is to provide a simple and convenient means for testing the relative porosity of a sample of a substance or material.

A more specific object of the invention is to test the porosity of a sample of a substance by establishing a measured pressure differential across a sample of the substance and then measuring the time rate of flow or diffusion of a measured volume of gas through the sample.

Another object of the invention is to provide a device for measuring the porosity of a substance comprising means for producing very low pressures on opposite sides of a sample of the substance, ion gauges for measuring the pressures on opposite sides and means including a volume manometer and a leak port for allowing measured volumes of a gas to diffuse through the sample, the rate of diffusion being measured against time.

Further objects and advantages of the invention will become apparent from the following detailed description and annexed drawings wherein the figure is a representation of one embodiment of a system incorporating my invention and with which my invention may be practiced.

With reference to the drawing, numeral 1 designates a generally tubular structure which may preferably be made of glass and which may be separated along the line Y—Y and which may be rejoined and sealed along the same line after a sample of material to be tested designated by numeral 2 has been fitted into the left hand part of 1. The sample 2 may preferably comprise a disc of the material to be tested of a given thickness, the disc fitting snugly into the tubular structure so as to prevent any leakage or passage of air or gas around the edges of the disc. The right end of the tubular structure 1 is connected to an oil diffusion pump 3 which may be of any known type and which serves to evacuate the tubular structure to a very low pressure of the order of .05 micron of mercury. The left end of the tubular structure 1 is of smaller diameter as shown at 4 and this tubular portion connects to one leg 5 of a volume manometer 6, having another leg 7 open at the top. The leg 5 is adjacent a graduated scale as shown calibrated in cubic centimeters. Interposed in the tube portion 4 is an adjustable leak valve or leak port 8 in the form of a needle valve, adjustable by a knob as shown, and a stop cock 9. Also in the tube portion 4 to the left of leg 5 is another stop cock 10 by which air may be admitted to the tube 4 and the leg 5 of manometer 6.

Numerals 12 and 13 designate pressure measuring devices which are of the type employing an iron gauge tube for measuring the pressure. The pressures are read on milliammeters connected to the ion gauge tubes and the milliammeters as well known in the art are calibrated in microns of mercury.

In operation of the invention, the tubular structure 1 is separated along Y—Y and a sample 2 which may be a disc of carbon, for example, is inserted in the left hand portion of 1 and the parts are resealed together along Y—Y. Stop cocks 9 and 10 are then opened and the needle valve 8 is set to fully closed position by the knob at the top. With the parts in this position, the height of the liquid in the two legs of the manometer will be the same since both legs are open to atmospheric pressure. The system is now pumped down by means of the diffusion pump 3, that is, all of the systems to the right of the needle valve or leak port 8 which as stated above was closed. The system is pumped down to a degree of vacuum at which it is desired to measure the diffusivity of the sample 2 and this pressure may be of the order of .05 microns of mercury. With the vacuum in the neighborhood of this value as indicated by the ion gauges 12 and 13, both the stop cocks 9 and 10 are closed and a reading is taken of the height of the liquid level in leg 5 of the manometer by means of the graduated scale; substantially simultaneously the needle valve 8 is cracked open to a very small opening and the stop cock 9 is open to thereby permit air from within the leg 5 of the manometer and the tubular portion 4 to leak through the leak port 8 into the tubular structure 1. The reading thus initially taken on the calibrated scale is the first reading of the test, that is, the reading taken at zero minutes of the test run.

The ion gauges 12 and 13 are read simultaneously and are the pressure readings for the beginning of the test run. A stop watch is started when the first reading is taken. The air which slowly leaks through the leak port 8 will enter the tubular structure 1 and diffuse through the sample 2 at a rate depending upon its porosity and upon the pressure differential. The level in leg 5 of the manometer will rise as air leaks out. Readings may be taken at 1 minute intervals of the height of liquid in the manometer leg 5 and of the ion gauges and the relative porosity may then be determined by observing the readings. If the sample is highly porous, the volume as measured by manometer 6 will, of course, change faster in a given time than with a sample that is not so porous. The indicated porosity will, of course, not depend entirely upon the volume change but also on the pressure differential across the sample as measured by the ion gauges. If the leakport is of small size, the pressure differential may not change considerably during the test run and in fact it may remain constant for an appreciable time and therefore the change in volume as measured by the manometer itself will be a reasonably accurate indication of the relative porosity of the sample. That is, if the differential is small, and what is more signficant if it does not change appreciably during the run, it has negligible bearing on the change in volume as measured by the manometer. The tables below give sample sets of test readings, one for a sample of material consisting of a disk of carbon and another for a sample of material consisting of a disk of porous clay. In the tables under the headings 5, T, 12 and 13 are respectively the manometer readings, the time in minutes after the starting of a test run, and the pressure readings given by ion gauges 12 and 13.

| Carbon | | | | Clay | | | |
|---|---|---|---|---|---|---|---|
| 5 | T | 12 | 13 | 5 | T | 12 | 13 |
| .0 | 0 | .05 | .05 | 1.2 | 0 | .05 | .05 |
| .1 | 1 | .09 | .09 | 1.3 | 1 | .06 | .06 |
| .3 | 2 | .06 | .06 | 1.4 | 2 | .07 | .06 |
| .5 | 3 | .08 | .08 | 1.5 | 3 | .08 | .06 |
| .8 | 4 | .1 | .08 | 1.6 | 4 | .08 | .06 |
| 1.1 | 5 | .1 | .08 | 1.7 | 5 | .09 | .07 |
| 1.4 | 6 | .09 | .08 | 1.8 | 6 | .09 | .07 |
| 1.7 | 7 | .08 | .08 | 1.9 | 7 | .1 | .07 |
| 1.9 | 8 | .09 | .09 | 2.0 | 8 | .1 | .07 |

It will be noted that for both samples, the pressure differential is very small, if there is any differential, and it is relatively unvarying throughout the test so that the change in volume alone can properly be considered as a reasonably accurate measure of the porosity of the samples. It will be noted that for carbon the rate of diffusion of air through the sample by observing the readings was throughout the test either .2 or .3 cubic centimeter per minute; on the other hand, for the clay sample the rate of diffusion of air through the sample was .1 cubic centimeter per minute. That is, the reading of the calibrated scale adjacent leg 5 of the manometer changed this amount each minute. In other words, from the foregoing it is to be observed that air diffused more rapidly through the carbon than it did through the clay, the rate of diffusion through the carbon being .2 or .3 cubic centimeter per minute while the rate of diffusion through the clay was .1 cubic centimeter per minute. The carbon employed herein is therefore a more porous material than the clay tested.

In the same manner, the relative porosity of any desired sample may be checked by running a test in the manner described above.

From the foregoing it is to be seen that from observation of the readings taken my invention provides a relatively simple and convenient way of checking the porosity of a sample of a substance.

The embodiment of my invention which I have described is representative of its preferred form. Variations may be made in the structure used in practicing the invention and in the method. The disclosure is not to be interpreted in a limited sense it being intended that the invention be limited only in accordance with the scope of the claims appended hereto.

I claim:

1. A device for measuring the porosity of a substance comprising, in combination, means forming a passageway divisible into first and second chambers by insertion of a sample of said substance therein, first valve means defining the intake end of said first chamber, evacuating means connected to the exit end of said second chamber to maintain substantially equal pressures in said chambers, a third chamber communicating with a source of gas through an entry valve and with said first chamber through said first valve means, a manometer communicating with said third chamber, and a leak port disposed within said third chamber between said manometer and said first valve means for bleeding said gas therethrough.

2. A device for measuring porosity of a substance comprising means forming a passageway having a sample of the substance closing the passageway so that gas may diffuse through the substance, pressure responsive means for measuring the pressure on at least one side of the sample, means forming a variable volume chamber having inlet and outlet ports and communicating through a leak port with said passageway on one side of said sample and means permitting the independent opening and closing each of said ports, the change in volume of said chamber over a given period of time being indicative of the porosity of the substance.

CONRAD G. BACON.

REFERENCES CITED

The following references are of record in the file of this patent:

UNITED STATES PATENTS

| Number | Name | Date |
|---|---|---|
| 1,266,570 | Farnsworth | May 21, 1918 |
| 1,305,247 | Abrams | Nov. 1, 1921 |
| 1,599,964 | Haven | Sept. 14, 1926 |
| 2,113,686 | Gift | Apr. 12, 1938 |

OTHER REFERENCES

Bureau of Standards Research Paper RP682 (part of Journal of Research, vol. 12, May 1934), contains pages 587 to 608.